United States Patent [19]
McMichael et al.

[11] Patent Number: 4,973,154
[45] Date of Patent: Nov. 27, 1990

[54] NONLINEAR OPTICAL RANGING IMAGER

[75] Inventors: Ian C. McMichael, Port Hueneme; Mohsen Khoshnevisan, Newbury Park, both of Calif.

[73] Assignee: Rockwell International Corporation, El Segundo, Calif.

[21] Appl. No.: 344,177

[22] Filed: Apr. 27, 1989

[51] Int. Cl.$^5$ .............................................. G01B 9/02
[52] U.S. Cl. ...................................... 356/4.5; 356/349
[58] Field of Search ................................ 356/4.5, 349

[56] References Cited

U.S. PATENT DOCUMENTS

| | | | |
|---|---|---|---|
| 4,499,492 | 2/1985 | Hutchin | 356/4.5 X |
| 4,716,414 | 12/1987 | Luttrell et al. | 356/4.5 X |
| 4,906,092 | 3/1990 | O'Meara | 356/4.5 X |

OTHER PUBLICATIONS

Fischer et al., Amplified Reflection, Transmission, and Self–Oscillation in Real–Time Holography, Optics Letters, vol. 6, p. 519 (1981).
Huignard et al., Coherent Signal Beam Amplification in Two–Wave Mixing Experiments with Photorefractive $Bi_2SiO_2$ Crystals, Optics Comms., vol. 38, p. 249 (1981).
Kukhtarev et al., Holographic Storage in Electrooptic Crystals. II. Beam Coupling–Light Amplification, Ferroelectrics, vol. 22, p. 961 (1979).
Liu, Infrared Predetection Dynamic Range Compressioin via Photorefractive Crystals, Applied Optics, vol. 27, p. 1006 (1988).
Liu, Real–Time Dynamic Range Compression, Journal of the Optical Society of America A, vol. 3, p. P51 (1986).
McMichael, Phase Shifts of Photorefractive Gratings and Phase–Conjugate Waves, Optics Letters, vol. 12, p. 48 (1987).
Wang, Laser Doppler Displacement Measurement, Laser & Optronics, p. 69 (Sep. 1987).

Primary Examiner—Davis L. Willis
Assistant Examiner—Matthew W. Koren
Attorney, Agent, or Firm—John J. Deinken

[57] ABSTRACT

A three-dimensional object is imaged by providing a coherent beam of light with a periodic variation in frequency and dividing the beam into a probe beam and a pump beam. The probe beam is directed toward the object, such that the frequency profile of the probe beam after reflection from the object is determined by the depth profile of the object. The pump beam and the reflected probe beam are directed into a nonlinear medium, such that two-wave mixing between the beams occurs in the medium, the two-wave mixing process causing the frequency profile of the probe beam to be converted to an intensity profile. The method may be further refined by adjusting the optical path length of the pump beam in order to adjust the accuracy range of the depth profile which is imaged. In addition, the reflected intensity profile of the object can be obtained from the reflected probe beam prior to the mixing of the probe beam and the pump beam and subtracted from the converted intensity profile to correct the converted intensity profile for variations in the surface reflectivity of the object. A nonlinear optical ranging imager for imaging a three-dimensional object includes a source of coherent light with a periodic variation in frequency and a beam splitter for dividing the source into a pump beam and a probe beam directed at the object, such that a frequency profile of the probe beam after reflection from the object is determined by the depth profile of the object. A nonlinear optical medium receives the reflected probe beam and the pump beam, such that two-wave mixing between the two beams occurs within the medium, the two-wave mixing process causing the frequency profile of the probe beam to be converted to an intensity profile.

6 Claims, 3 Drawing Sheets

NONLINEAR OPTICAL RANGING IMAGER

BACKGROUND OF THE INVENTION

This invention is concerned with optical techniques for imaging a three-dimensional object in a two-dimensional format.

The general principle of a chirped radar involves sending out a laser beam whose frequency is linearly chirped in time at a rate given by $S = \Delta f/\Delta t$. When this beam strikes an object it is reflected and arrives at a receiver at a later time. Due to the chirp in the laser frequency, the instantaneous frequency from the laser and that of the beam returning from the target will be somewhat different. This frequency difference is proportional to the total path of the light beam to and from the target. For a distance L to the target, the round trip time is given by $T = 2L/c$, where c is the speed of light. Therefore, if the returned beam is mixed with the instantaneous output of the laser (or with a reflection of the laser beam from a reference standard), a beat frequency indicative of the distance L will be observed. The beat frequency $f_o$ is given by $f_o = 2LS/c$. Measurement of the beat frequency over a two-dimensional image will thus provide a map of the depth information for the imaged object in terms of variations in L. Very accurate profiling measurements can be carried out using this chirped laser beam interferometry. Even though the depth information is known, however, from the beat frequency profile over the object, displaying this information in real time requires frequency measurements over numerous pixels (512×512, for example). The output of this information can be time consuming, even with fast electronic processing, because in many cases the beat frequencies will be small, i.e., on the order of a kilohertz. The measurement of such frequencies would require on the order of milliseconds per pixel.

Sometimes it is desirable that this three-dimensional data (the two-dimensional image information plus the beat frequency profile) be observed on a television screen (for industrial inspection, for example). The process of visually observing the beat frequency profile requires transfer of the frequency information to a television screen and modulating the intensity of each pixel by that information.

SUMMARY OF THE INVENTION

A method of imaging a three-dimensional object includes the steps of providing a coherent beam of light with a periodic variation in frequency and dividing the beam into a probe beam and a pump beam. The probe beam is directed toward the object, such that the frequency profile of the probe beam after reflection from the object is determined by the depth profile of the object. The pump beam and the reflected probe beam are directed into a nonlinear medium, such that two-wave mixing between the beams occurs in the medium, the two-wave mixing process causing the frequency profile of the probe beam to be converted to an intensity profile.

The method may be further refined by adjusting the optical path length of the pump beam in order to adjust the accuracy range of the depth profile which is imaged. In addition, the reflected intensity profile of the object can be obtained from the reflected probe beam prior to the mixing of the probe beam and the pump beam and subtracted from the converted intensity profile to correct the converted intensity profile for variations in the surface reflectivity of the object.

A nonlinear optical ranging imager for imaging a three-dimensional object includes a source of coherent light with a periodic variation in frequency and a beam splitter for dividing the source into a pump beam and a probe beam directed at the object, such that the frequency profile of the probe beam after reflection from the object is determined by the depth profile of the object. A nonlinear optical medium receives the reflected probe beam and the pump beam, such that two-wave mixing between the two beams occurs within the medium, the two-wave mixing process causing the frequency profile of the probe beam to be converted to an intensity profile.

In a more particular embodiment, the imager also includes a provision for adjusting the optical path length of the pump beam in order to adjust the accuracy range of the depth profile which is imaged. In addition, a comparator may be added to the imager for subtracting the reflected intensity profile of the object from the converted intensity profile to correct the converted intensity profile for variations in the surface reflectivity of the object.

DESCRIPTION OF THE INVENTION

It is an outstanding feature of this invention to combine the process of chirped laser interferometry with nonlinear optical two-wave mixing, thereby automatically transferring depth information about an object to an intensity modulation of a two-dimensional image of the object. The process is expected to be much faster than techniques in the prior art, because beat frequencies for each pixel in the image need not be measured separately and serially. Instead, the beat frequencies are used to modulate the strength of nonlinear holograms inside a nonlinear optical medium, proportional to the beat frequency differences. The process is carried out in parallel for all of the pixels in the image. The physical process that allows for such an powerful capability is the sensitivity of photorefractive holograms to frequency differences between interfering beams. The largest two-wave mixing gain is for the case of equal frequencies. As the frequencies become different, the gain drops.

Figure 1:
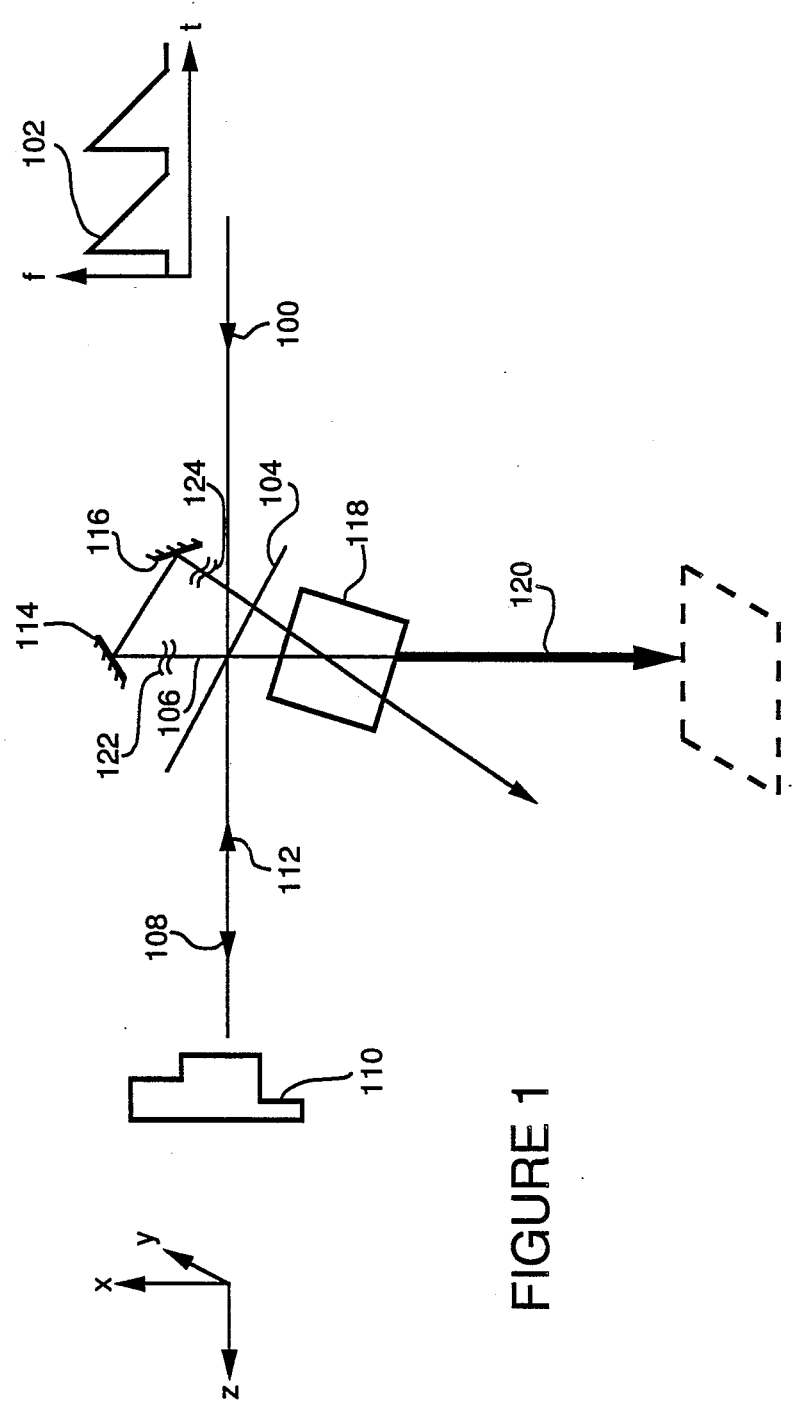
FIG. 1 is a schematic illustration of one embodiment of a nonlinear optical ranging imager constructed according to the present invention.

One embodiment of a nonlinear optical ranging imager for imaging a three-dimensional object is illustrated in schematic form in FIG. 1. A laser provides a source of coherent light 100. This source is frequency chirped, i.e., it exhibits a periodic variation in frequency, as illustrated by the frequency versus time diagram 102. A beam splitter 104 divides the frequency chirped laser beam into a pump beam 106 and a probe beam 108. The probe beam 108 is directed at a three-dimensional object 110. When a frequency chirped laser beam is reflected by an object, the frequency profile of the return beam is determined by the depth profile of the illuminated surface. Thus the frequency profile of the reflected probe beam 112 is determined by the depth profile of the object 110. The reflected probe beam 112 and the pump beam 106 (after reflection by mirrors 114 and 116) are directed into a nonlinear medium 118, such as, for example, a photorefractive crystal. Two-wave mixing between the two beams within the medium causes the frequency profile of the probe beam to be converted to an intensity profile in the output probe beam 120 because of the frequency sensitivity of the two-wave mixing process (see, for example, U.S. patent application No. 827,583, filed Feb. 10, 1986; Fischer, et al., Amplified Reflection, Transmission and Self-Oscillation in Real-Time Holography, Optics Letters, Volume 6, Page 519 (1981); Huignard, et al., Coherent Signal Beam Amplification in Two-Wave Mixing Experiments with Photorefractive B.S.O. Crystals, Optics Communications, Volume 38, Page 249 (1981); Kukhtarev, et al., Holographic Storage in Electrooptic Crystals. Beam Coupling and Light Amplification, Ferroelectrics, Volume 22, Page 961 (1979)). At any given time, light returning from different distances will have different frequencies. Only the light coming from a single specific distance will have a mixer product with the reference light falling within the bandwidth of the two-wave mixing process and be amplified. Thus, variations in frequency across the reflected image are translated into an intensity modulation of the amplified image corresponding to the depth profile of the object.

The pump beam is used to amplify the object image. Variations in the frequency difference over the image will manifest themselves as corresponding variations in the strength of the photorefractive holograms formed in the medium 118. The amplified image will then be modulated by the frequency differences, which are themselves indicative of the depth information over the object. In addition to allowing visual observation of three-dimensional information about an object, i.e., with depth information, this invention will also allow the adjustment of the range over the object for which accurate monitoring is carried out. Varying the amplitude and period of the frequency chirp and the path length of the reference arm will allow control of the ranging distances. Since photorefractive response time varies inversely with intensity, depth sensitivity can be controlled by adjusting the intensity of the reference beam. This is accomplished by the adjustment of the optical path length of the reference pump beam, as indicated by the breaks 122 and 124 in the pump beam. The path length can be adjusted, for example, by physically changing the distance through which the pump beam travels or by introducing an optical delay line in the pump beam path.

Figure 2:
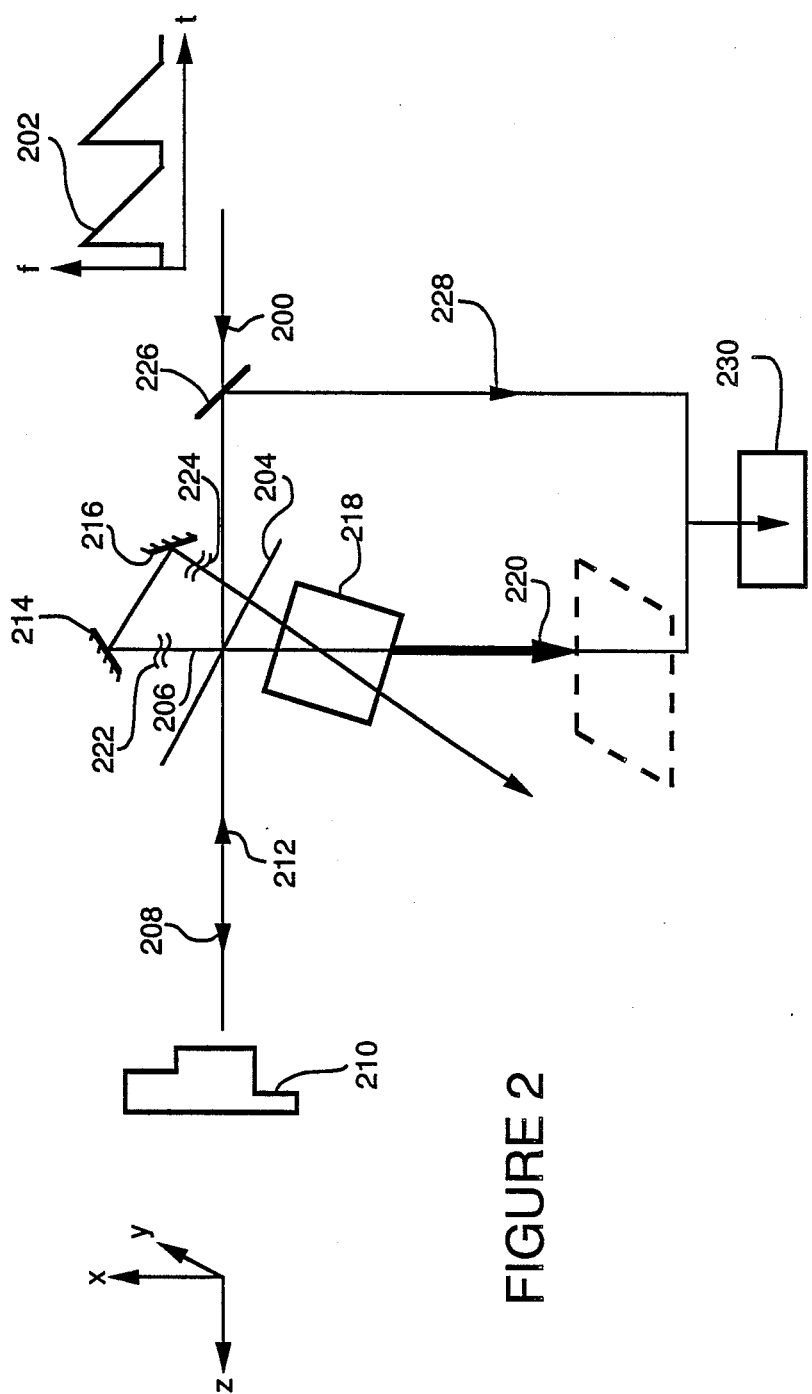
FIG. 2 is a schematic drawing similar to FIG. 1, but with the addition of a second beam splitter to obtain a portion of the reflected probe beam as a reflectance reference beam.

The system of this invention is also flexible in terms of the control of depth sensitivity by adjusting the intensity of the reference beam, which will control the photorefractive bandwidth of the nonlinear medium 118. Considerable calibrations may be required, however, particularly for accurate depth sensitivity. Moreover, it may be necessary that, for some targets with large variations in their surface reflectivity profile, a direct image of the target containing the reflectance profile must also be used to compare with the nonlinearly amplified image. One way in which this capability may be provided is shown schematically in FIG. 2. This embodiment is similar to that shown in FIG. 1, except that a second beam splitter 226 obtains a portion of the reflected probe beam 212 as a reflectance reference beam 228. The reference beam 228 is used to compare the reflectance profile with the amplified depth profile image. This comparison, which is accomplished by a comparator 230, may be made electronically or optically as, for example, by coherent image comparison methods.

Figure 3:
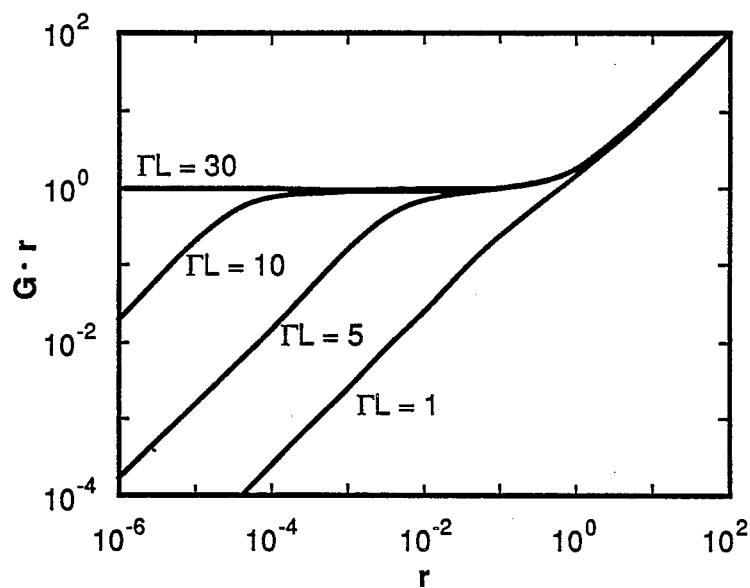
FIG. 3 is a plot of amplified probe beam intensity as a function of input probe beam intensity for several values of photorefractive crystal gain.

Using a relatively slow nonlinear medium in this technique increases the sensitivity of the measurement by decreasing the two-wave mixing bandwidth. Two-wave mixing, however, can also be used in the pump depletion regime prior to imaging to achieve dynamic range compression and remove the effects of variable surface reflectivity from the return beam (see, for example, Liu, et al., Journal of the Optical Society of America A, Volume 3, Page 51 (1986); Liu, et al., Applied Optics, Volume 27, Page 1006 (1988)). In the latter instance, a fast, high-gain nonlinear medium is required to provide the wide bandwidth required for efficient two-wave mixing over the entire frequency chirp. FIG. 3 is a plot of amplified probe beam intensity as a function of input probe beam intensity for several values of photorefractive crystal gain $\Gamma$, using the theoretical expression for two-beam coupling gain given by $G = (1+r)\exp(\Gamma L)/[1 + r\exp(\Gamma L)]$, where r is the ratio of input probe beam intensity to input pump beam intensity, and L is the interaction length within the photorefractive crystal. The flat sections of these curves denote regions over which the amplified probe intensity is nearly constant for a range of incident probe intensities. Note that the width of the flat region increases with increasing crystal gain.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

U.S. patent application No. 827,583, filed Feb. 10, 1986;

Fischer, et al., Amplified Reflection, Transmission and Self-Oscillation in Real-Time Holography, Optics Letters, Volume 6, Page 519 (1981);

Huignard, et al., Coherent Signal Beam Amplification in Two-Wave Mixing Experiments with Photorefractive B.S.O. Crystals, Optics Communications, Volume 38, Page 249 (1981); and Kukhtarev, et al., Holographic Storage in Electrooptic Crystals. Beam Coupling and Light Amplification, Ferroelectrics, Volume 22, Page 961 (1979).

We claim:

1. A method of imaging a three-dimensional object, comprising the steps of:
   providing a coherent beam of light with a periodic variation in frequency;
   dividing the beam into a probe beam and a pump beam;
   directing the probe beam toward the object, such that the frequency profile of the probe beam after reflection from the object is determined by the depth profile of the object; and directing the pump beam and the reflected probe beam into a nonlinear medium, such that two-wave mixing between the beams occurs in the medium, the two-wave mixing process causing the frequency profile of the probe beam to be converted to an intensity profile.

2. The method of claim 1, further comprising the step of:

adjusting the optical path length of the pump beam in order to adjust the accuracy range of the depth profile which is imaged.

3. The method of claim 1, further comprising the step of:

obtaining the reflected intensity profile of the object from the reflected probe beam prior to the mixing of the probe beam and the pump beam; and subtracting the reflected intensity profile from the converted intensity profile, to correct the converted intensity profile for variations in the surface reflectivity of the object.

4. A nonlinear optical ranging imager for imaging a three-dimensional object, comprising:

a source of coherent light with a periodic variation in frequency;

a beam splitter for dividing the source into a pump beam and a probe beam directed at the object, such that the frequency profile of the probe beam after reflection from the object is determined by the depth profile of the object; and a nonlinear optical medium for receiving the reflected probe beam and the pump beam, such that two-wave mixing between the two beams occurs within the medium, the two-wave mixing process causing the frequency profile of the probe beam to be converted to an intensity profile.

5. The imager of claim 4, further comprising:

means for adjusting the optical path length of the pump beam in order to adjust the accuracy range of the depth profile which is imaged.

6. The imager of claim 4, further comprising:

a comparator for subtracting the reflected intensity profile of the object from the converted intensity profile to correct the converted intensity profile for variations in the surface reflectivity of the object.

* * * * *